(12) United States Patent
Hu et al.

(10) Patent No.: US 11,973,633 B1
(45) Date of Patent: Apr. 30, 2024

(54) METHOD AND SYSTEM FOR DIAGNOSIS OF ERROR CODING FAULTS FROM MULTIPLE INSTRUMENTS

(71) Applicant: Guangdong University of Petrochemical Technology, Maoming (CN)

(72) Inventors: Shaolin Hu, Maoming (CN); Jinpeng Chen, Maoming (CN); Guanhua Zhu, Maoming (CN); Ye Ke, Maoming (CN); Naiquan Su, Maoming (CN)

(73) Assignee: Guangdong University of Petrochemical Technology, Maoming (CN)

( * ) Notice: Subject to any disclaimer, the term of this patent is extended or adjusted under 35 U.S.C. 154(b) by 0 days.

(21) Appl. No.: 18/057,224

(22) Filed: Nov. 20, 2022

(51) Int. Cl.
*G06F 15/173* (2006.01)
*G06F 17/16* (2006.01)
*H04L 41/0631* (2022.01)
*H04L 41/0681* (2022.01)
*H04L 43/067* (2022.01)

(52) U.S. Cl.
CPC .......... *H04L 41/0631* (2013.01); *G06F 17/16* (2013.01); *H04L 41/0681* (2013.01); *H04L 43/067* (2013.01)

(58) Field of Classification Search
CPC ............ H04L 41/0631; H04L 41/0681; H04L 43/067; G06F 17/16
USPC ........................................ 709/224
See application file for complete search history.

(56) References Cited

U.S. PATENT DOCUMENTS

| | | | |
|---|---|---|---|
| 2019/0109581 A1* | 4/2019 | Khalifi | H03H 21/0043 |
| 2023/0222336 A1* | 7/2023 | Redford | G06N 20/00 706/20 |

* cited by examiner

*Primary Examiner* — Alan S Chou
(74) *Attorney, Agent, or Firm* — Thomas J. Brindisi

(57) ABSTRACT

A method and system for diagnosis of error coding faults from multiple instruments are provided. The method includes acquiring sampling data series of a combination of instruments in a petrochemical process, determining a type of the sampling data series, and performing error diagnosis according to the type. The present disclosure can solve the error coding problem in a multi-instrument cooperation mode and provide safe and reliable data guarantee for safe and efficient petrochemical production.

12 Claims, 9 Drawing Sheets

METHOD AND SYSTEM FOR DIAGNOSIS OF ERROR CODING FAULTS FROM MULTIPLE INSTRUMENTS

TECHNICAL FIELD

The present disclosure relates to the fields of outlier data diagnosis and industrial automation, and in particular, to a method and system for diagnosis of error coding faults from multiple instruments.

BACKGROUND

The so-called error coding fault refers to the fault caused by error coding, some typical forms of which are abnormal data or outliers. Automatic instruments play a crucial role in guaranteeing the stability and safety of production. Once instruments misbehave or present abnormal data, the sensing of production may be affected or even disastrous production accidents may be induced. Especially in the fields of petrochemical engineering and the like that involve the production of flammable and combustible materials, in consideration of the characteristics such as pipelining, process-based, totally closed production, technicians can determine whether the process is normal and whether the products are satisfied based on various process parameters displayed on detection instruments, or can decide whether the production is increased or reduced or even stopped based on instrument indication data information. Thus, process operations are directly closely related to data monitored by instruments.

Conventional instruments in a petrochemical production site mainly include four kinds of measuring or monitoring instruments for temperature, pressure, flow and liquid level. Due to long-term service of instruments and oil and gas corrosion thereto, petrochemical instruments may inevitably have some problems, reflected in instrument measurement data, typically including error coding, drifting, inaccurate display, or instrument data changing failure. For example, temperature data have an abnormal increase/decrease or a drastic fluctuation or quick shock; pressure data have a sudden increase/decrease or a drastic fluctuation or keep unchanged; flow data have an abnormal increase/decrease or a drastic fluctuation; and liquid level monitoring data have a sudden increase/decrease or frequent fluctuations, or liquid level values indicated in a master control room being in conformity with those in the site.

Existing research on the fault problems of conventional instruments in the field of petrochemical production have mainly focused on mechanism analysis of fault causes, intuitive description of fault affected instrument data, and direct diagnosis based on the mechanism, which hardly can be used for instrument fault analysis and diagnosis in complex cases such as a complicated pattern of manifestation, multi-factor coupling and multi-instrument cooperative work. Therefore, there is a need for means for diagnosis of the error coding problem in a multi-instrument cooperation mode, thus providing safe and reliable data guarantee for safe and efficient petrochemical production.

SUMMARY

An objective of the present disclosure is to provide a method and system for diagnosis of error coding faults from multiple instruments that can solve the error coding problem in the multi-instrument cooperation mode. A method for diagnosis of error coding faults from multiple instruments includes:

acquiring a sampling data series of a combination of instruments in a petrochemical process;

determining a type of the sampling data series, the type of the sampling data series including a multi-dimensional weakly stationary time series and a multi-dimensional non-stationary time series;

determining a semiorder relation of the sampling data series and then performing error diagnosis when the sampling data series is the multi-dimensional weakly stationary time series; and eliminating time-varying components by using a sliding outlier-tolerant filtering method, determining a sampling data series without the time-varying components, and then performing error diagnosis when the sampling data series is the multi-dimensional non-stationary time series.

Optionally, the determining a semiorder relation of the sampling data series and then performing error diagnosis when the sampling data series is the multi-dimensional weakly stationary time series may specifically include:

determining a mathematical expectation and a covariance matrix of the sampling data series;

constructing a ranking function for multi-dimensional sampling time sequence data according to the mathematical expectation and the covariance matrix, obtaining a ranked series by ranking in an ascending order, and then determining the semiorder relation of the sampling data series to obtain a partially ordered set;

eliminating data in a set proportion at the tail end of the partially ordered set with N samples, and redetermining a mathematical expectation and a covariance matrix;

determining a correction value for the ranking function according to the redetermined mathematical expectation and the redetermined covariance matrix, obtaining a corrected ranked series by ranking in an ascending order, and then determining a partially ordered instrument sampling series set; and constructing a detection function according to the redetermined mathematical expectation and the redetermined covariance matrix, and performing error diagnosis on the partially ordered instrument sampling series set using the detection function.

Optionally, the eliminating time-varying components by using a sliding outlier-tolerant filtering method, determining a sampling data series without the time-varying components, and then performing error diagnosis when the sampling data series is the multi-dimensional non-stationary time series may specifically include:

determining and extracting the time-varying components from the sampling data series by using the sliding outlier-tolerant filtering method;

performing comparison and subtraction between the sampling data series and the extracted time-varying components to determine a multi-dimensional residual series;

creating a monitoring threshold for the residual series; and constructing an error detection function, and performing detection on the sampling data series using the error detection function and the monitoring threshold to realize error diagnosis.

A method and system for diagnosis of error coding faults from multiple instruments provided in the present disclosure can solve the error coding problem in the multi-instrument cooperation mode and provide safe and reliable data guarantee for safe and efficient petrochemical production by converting monitoring data acquired by multiple instruments into a sampling data series and then performing error diagnosis according to the type of the sampling data series of a combination of instruments.

DETAILED DESCRIPTION OF EMBODIMENTS

Figure 1:
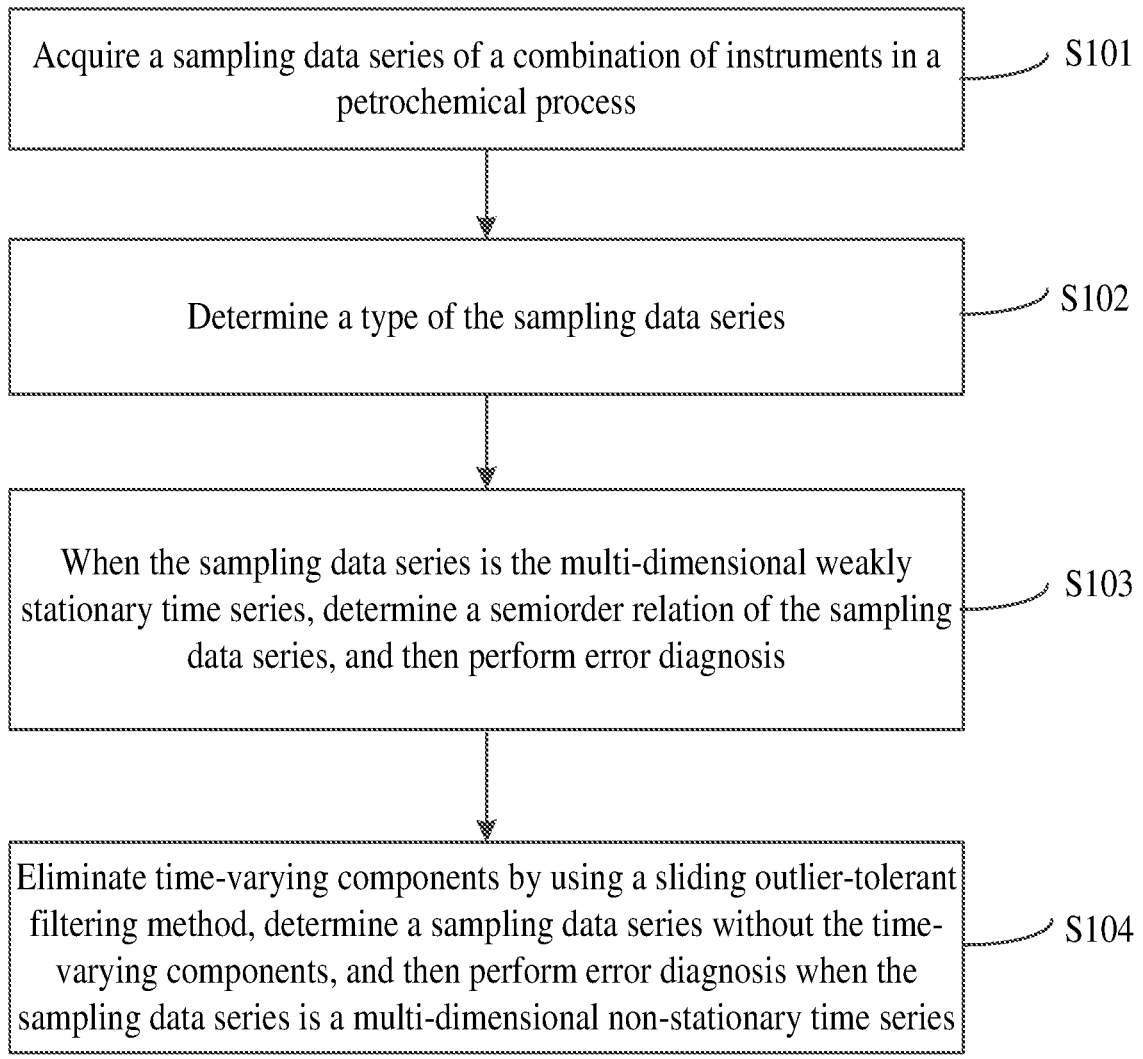
FIG. 1 is a schematic flowchart of a method diagnosis of error coding faults from multiple instruments provided in the present disclosure.
Figure 2:
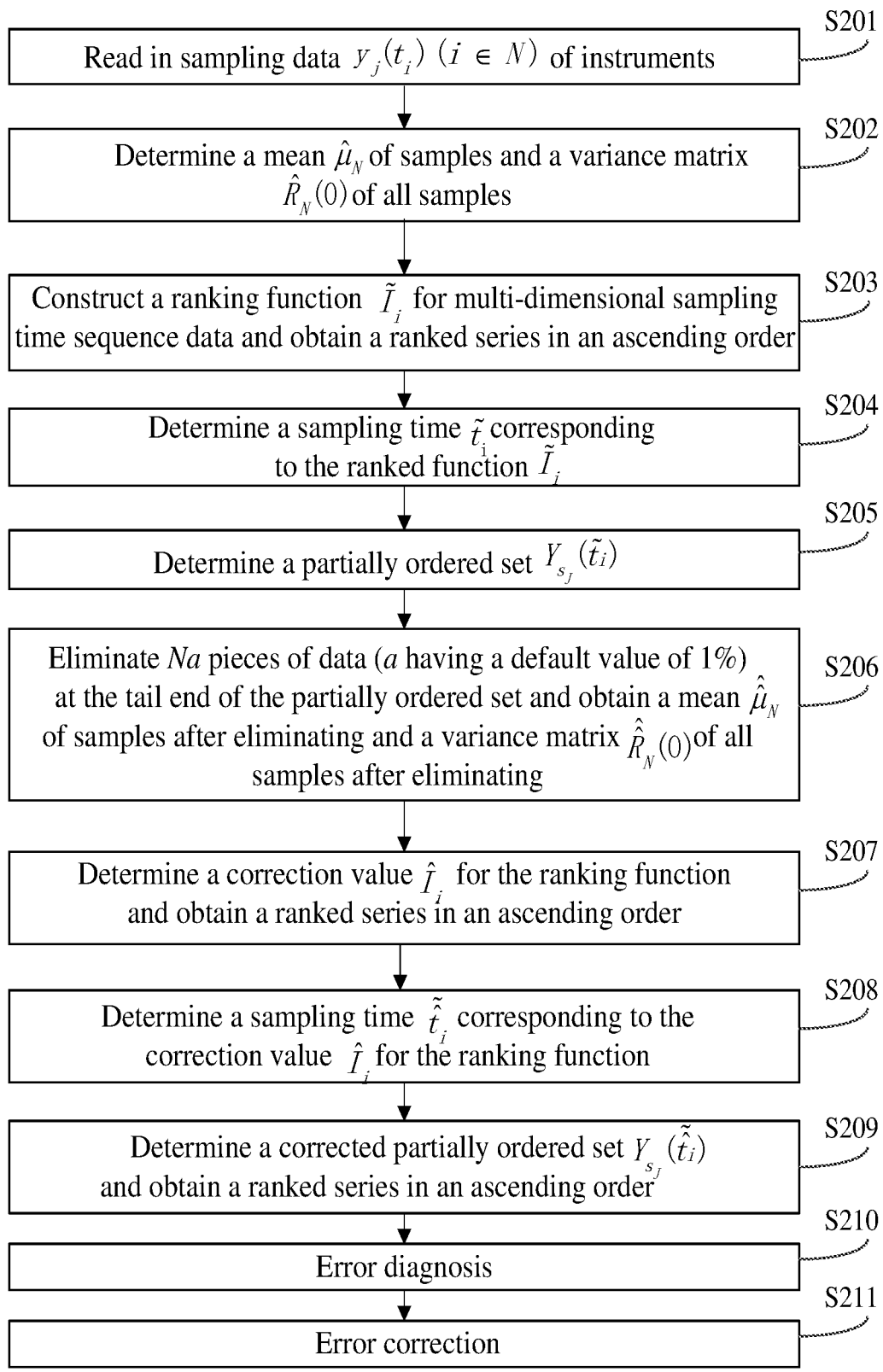
FIG. 2 is a schematic flowchart of error diagnosis for a J-dimensional weakly stationary time series.

As shown in FIGS. 1 and 2, a method for diagnosis of error coding faults from multiple instruments provided in the present disclosure includes the following steps. At S101, a sampling data series $Y_{s_j}(t_i)(i \in N)$ from a combination $S_J$ of instruments consisting of J instruments in a petrochemical process is acquired (step S201 in FIG. 2), where the combination of instruments can include multiple instruments, and types of the instruments can be the same or different. Generally, the combination of instruments includes a temperature instrument, a material level instrument, a pressure measuring instrument, a flow monitoring instrument, and the like. The sampled data of a conventional instrument $j \in S_J$ at any time $t_i$ is $y_j(t_i)(i \in N)$.

At S102, a type of the sampling data series is determined, where the type of the sampling data series includes a J-dimensional weakly stationary time series or a J-dimensional non-stationary time series. Now, the determining the type of sampling data series is described as follows.

First, for the k-th one-dimensional sampling data series $\{y_k(t_i) | i=1, 2, \ldots, N\}$ $(k=1, \ldots, J)$ of a multi-dimensional sampling data series $\{Y_{s_j}(t_i) | i=1, 2, \ldots, N\}$, its sliding median filter sequence is calculated by using a sliding window with a width of 2s+1 sampling points, preferably 5 sampling points, as follows:

$$\hat{y}_k(t_i) = \underset{j=k-s,\ldots,k+s}{\text{median}} \{y_j(t_i)\}. \tag{1}$$

Further, the error-resistance sliding root variance estimation is expressed as:

$$\hat{\sigma}_k(t_i) = 1.483 \underset{j=k-s,\ldots,k+s}{\text{median}} \{|y_j(t_i) - \hat{y}_j(t_i)|\}, \tag{2}$$

where, median{ } is the median operator, which means taking a median value from a data sequence obtained by sorting data within a specified range, by size.

Second, a mean stationary detection index $\hat{b}_{y_k}$ and a root variance stationary detection index $\hat{b}_{\sigma_k}$ are calculated as follows:

$$\hat{b}_{y_k} = \frac{(N-s)\sum_{i=s+1}^{N-s} t_i \hat{y}_k(t_i) - \sum_{i=s+1}^{N-s} t_i \sum_{i=s+1}^{N-s} \hat{y}_k(t_i)}{(N-s)\sum_{i=s+1}^{N-s} t_i^2 - \left(\sum_{i=s+1}^{N-s} t_i\right)^2}, \text{ and}$$

$$\hat{b}_{\sigma_k} = \frac{(N-s)\sum_{i=s+1}^{N-s} t_i \hat{\sigma}_k(t_i) - \sum_{i=s+1}^{N-s} t_i \sum_{i=s+1}^{N-s} \hat{\sigma}_k(t_i)}{(N-s)\sum_{i=s+1}^{N-s} t_i^2 - \left(\sum_{i=s+1}^{N-s} t_i\right)^2}.$$

Third, the type of sampling data series can be determined according to the mean stationary detection index and the root variance stationary detection index.

When $\hat{b}_{y_k}$ and $\hat{b}_{\sigma_k}$ are both close to 0, (preferably detection threshold is set to ±0.05), it is determined that the k-th one-dimensional sampling data series $\{y_k(t_i) | i=1, 2, \ldots, N\}$ $(k=1, \ldots, J)$ is a weakly stationary time series. If J one-dimensional sampling data series are all weakly stationary time series, then the sampling data series of the instruments combination $S_J$ consisting of J instruments is determined to be the J-dimensional weakly stationary time series; otherwise, it is determined to be the J-dimension non-stationary time series.

The J-dimensional weakly stationary time series is divided into a first-order weakly stationary (a mean value not changing with time) series and a second-order weakly stationary (first-order weakly stationary and a covariance being a function of a sampling interval) series, and corresponding mathematical expectations are expressed as:

$$E\{Y_{s_j}(t_i)\}=\mu\in R^J \quad (3)$$

$$E\{Y_{s_j}(t_i)\}=\in R^s, Cov(Y_{s_j}(t_i)-\mu)(Y_{s_j}(t_j)-\mu)^T=R(t_j-t_i) \quad (4)$$

At S103, when the sampling data series is the multi-dimensional weakly stationary time series, a semiorder relation of the sampling data series is determined, and then error diagnosis is performed. S103 specifically includes the following steps:

A mathematical expectation and a covariance matrix of the sampling data series are determined (step S202 in FIG. 2).

During petrochemical production, when the conventional instruments operate normally, their sampled data are mostly the first-order weakly stationary data series. For the sampling data series having a length N, the linear unbiased estimate of the mathematical expectation $\mu \in R^s$ is expressed as:

$$\hat{\mu}_N = \frac{1}{N}\sum_{i=1}^{N} Y_{s_J}(t_i) \quad (5)$$

The optimal second-order moment estimate of the covariance matrix R(0) is expressed as:

$$\hat{R}_N(0) = \frac{1}{N-1}\sum_{i=1}^{N}\left(Y_{s_J}(t_i) - \hat{\mu}_N\right)\left(Y_{s_J}(t_i) - \hat{\mu}_N\right)^T \quad (6)$$

A ranking function for multi-dimensional sampling time sequence data is constructed according to the mathematical expectation and the covariance matrix, and a ranked series $\tilde{I}_1 \leq \tilde{I}_2 \leq \ldots \leq \tilde{I}_N$ is obtained by ranking in an ascending order (step S203 in FIG. 2), where the ranking function is expressed as:

$$\tilde{I}_i=(Y_{s_j}(t_i)-\hat{\mu}_N)^T\hat{R}_N^{-1}(0)(Y_{s_j}(t_i)-\hat{\mu}_N)(i=1,2,\ldots,N) \quad (7)$$

A semiorder relation of the sampling data series is then determined (step S204 in FIG. 2). The sampling time corresponding to $\tilde{I}_i$ (i=1, ..., N) is $\tilde{t}_i$ (i=1, ..., N). Thus, a partially ordered set is obtained (step S205 in FIG. 2), which is expressed as:

$$Y_{s_J}(\tilde{t}_1) < y_{s_J}(\tilde{t}_2) < \ldots < Y_{s_J}(\tilde{t}_N) \quad (8)$$

Nα pieces of data (α having a default value of, e.g., 1%) at the tail end of the partially ordered set with N samples are eliminated, and a mathematical expectation and a covariance matrix are redetermined (step S206 in FIG. 2). As a specific example, Nα samples in a proportion of about α on the right of Equation (8) are deleted, and s=Nα. Outlier tolerance estimates of the expectation $\mu \in R^s$ and the covariance matrix R(0) are recalculated by Equations (5) and (6):

$$\hat{\mu}_N = \frac{1}{N}\sum_{i=1}^{N-s} Y_{s_J}(\tilde{t}_i); \hat{R}_N(0) = \frac{1}{N-s-1}\sum_{i=1}^{N-s}\left(Y_{s_J}(\tilde{t}_i) - \hat{\mu}_N\right)\left(Y_{s_J}(\tilde{t}_i) - \hat{\mu}_N\right)^T \quad (9)$$

A correction value for the ranking function is determined according to the redetermined mathematical expectation and the redetermined covariance matrix, and all the sample data are re-ranked in an ascending order ash $\hat{I}_1 \leq \hat{I}_2 \leq \ldots \leq \hat{I}_N$, thereby obtaining a corrected ranked series (step S207 in FIG. 2) and hence a partially ordered instrument sampling series set (steps S208-S209 in FIG. 2). The correction value for the ranking function is expressed as:

$$\hat{I}_i=(Y_{s_j}(t_i)-\hat{\mu}_N)^T\hat{R}_N^{-1}(0)(Y_{s_j}(t_i)-\hat{\mu}_N)(i=1,2,\ldots,N) \quad (10)$$

The partially ordered instrument sampling series set is expressed as:

$$Y_{s_J}(\hat{t}_1) < Y_{s_J}(\hat{t}_2) < \ldots < Y_{s_J}(\hat{t}_N) \quad (11)$$

Thus, it can be inferred that samples corresponding to abnormal error coding of instrument detection data during petrochemical production are ranked by possibility in an ascending order as $\{Y_{s_j}(\hat{t}_{N-s+1}), \ldots, Y_{s_j}(\hat{t}_N)\}$. In the technical route of the above-mentioned error coding identification process, by ranking samples twice, error coding samples can be ranked by the partially ordered set of possibilities.

A detection function is constructed according to the redetermined mathematical expectation and the redetermined covariance matrix, and error diagnosis is performed on the partially ordered instrument sampling series set using the detection function (step S210 in FIG. 2). The detection function is expressed as:

$$T_e(Y(\hat{t}_j))=(Y(\hat{t}_j)-\hat{\mu}_N)^T\hat{R}_N^{-1}(Y(\hat{t}_j)-\hat{\mu}_N)(j=N-s+1,\ldots,N) \quad (12)$$

A time mark set of suspected abnormal samples is constructed as:

$$S=\{\hat{t}_j|T_e(Y(\hat{t}_j))\geq 2(s+1), j=N-s+1,\ldots,N\} \quad (13)$$

There is a high probability that error coding occurs in the instrument detection data at each time in the set S. Thus, a safe elliptical pipeline L(t)={Y (t)|$T_e$(Y(t))=2 (s+1)} is constructed. When the instrument detection data exceeds the safe elliptical pipeline, it can be determined that the instrument data has an error.

At S104, when the sampling data series is the multi-dimensional non-stationary time series, time-varying components are eliminated by using a sliding outlier-tolerant filtering method, and then a sampling data series without the time-varying components is determined, followed by performing error diagnosis. S104 specifically includes:

determine and extract the time-varying components from the sampling data series by using the sliding outlier-tolerant filtering method;

perform comparison and subtraction between the sampling data series and the extracted time-varying components to determine a multi-dimensional residual series;

create a monitoring threshold for the residual series; and construct an error detection function, and perform error diagnosis on the sampling data series using the error detection function and the monitoring threshold.

Figure 3:
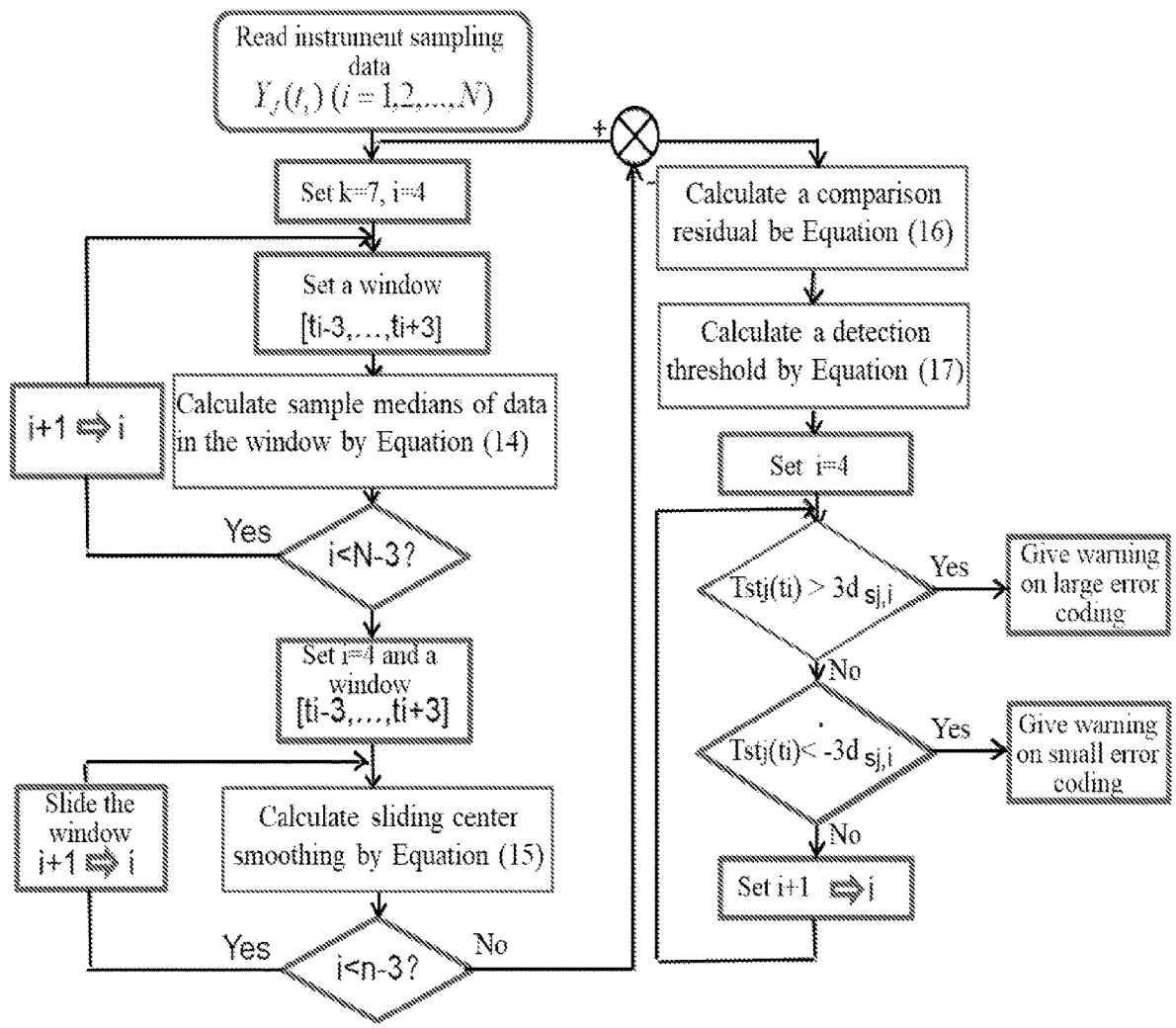
FIG. 3 is a schematic flowchart of error diagnosis for a J-dimensional non-stationary time series.

As a specific illustrative example, and as further illustrated in FIG. 3, S104 may specifically include the following steps:

Set a sliding window width k=7, pick out k continuous pieces of sampled data, rank all components in an ascending order, and form a median series with medians:

$$\hat{Y}_{SJ}(t_i) = \begin{pmatrix} \hat{y}_{s_J,1}(t_i) \\ \vdots \\ \hat{y}_{s_J,J}(t_i) \end{pmatrix} = \begin{pmatrix} \underset{k=i-3,\ldots,i+3}{med}\{y_{s_J,1}(t_k)\} \\ \vdots \\ \underset{k=i-3,\ldots,i+3}{med}\{y_{s_J,J}(t_k)\} \end{pmatrix} \quad (i = 4, \ldots, N-3) \quad (14)$$

Based on the median series $\{\hat{Y}_{s_j}(t_i)|i=4, \ldots, N-3\}$, construct k-point sliding central smoothing of a third-order polynomial by the following Equation:

$$\tilde{\hat{Y}}_{SJ}(t_i) = \begin{pmatrix} \hat{y}_1(t_i) \\ \vdots \\ \hat{y}_J(t_i) \end{pmatrix}; \quad (15)$$

$$\hat{y}_j(t_i) = (t_i^0 \ldots t_i^3)(X_i^T X^T)^{-1} X_i^T \begin{pmatrix} \hat{y}_{s_J,j}(t_{i-3}) \\ \vdots \\ \hat{y}_{s_J,j}(t_{i+3}) \end{pmatrix} (j=1,\ldots,J) \text{ where } X_i = \begin{pmatrix} t_{i-3}^0 & \cdots & t_{i-3}^0 \\ \vdots & & \vdots \\ t_{i+3}^0 & \cdots & t_{i+3}^0 \end{pmatrix} (i=4,\ldots,N-3);$$

Perform comparison and subtraction to form a multi-dimensional residual series of differences between instrument measurement data and sliding central smoothing:

$$\Delta Y(t_i) = Y_{s_j}(t_i) - \tilde{\hat{Y}}_{s_j}(t_i) \in R^J (i=4,\ldots,N-3) \quad (16)$$

Create a threshold, i.e., create a monitoring threshold for the residual series (14):

$$D_{SJ} = \begin{pmatrix} d_{SJ,1} \\ \vdots \\ d_{SJ,J} \end{pmatrix} = 1.483 \begin{pmatrix} \underset{i=4,\ldots,N-3}{med}|y_{s_J,1}(t_i)-\hat{y}_1(t_i)| \\ \vdots \\ \underset{i=4,\ldots,N-3}{med}|y_{s_J,J}(t_i)-\hat{y}_J(t_i)| \end{pmatrix} \quad (17)$$

Construct an error detection function:

$$Tst_j(t_i) = y_{s_j,j}(t_i) - \hat{y}_j(t_i) \quad (18)$$

Perform error diagnosis. In case of $Tst_j(t_i) > 3d_{s_j-j}$ of time $t_i \in \{1, 2, \ldots, N\}$ and No. $j \in \{1, 2, \ldots, J\}$, instrument $j \in \{1, 2, \ldots, J\}$ presents abnormally large error coding; and in case of $Tst_j(t_i) < -3d_{s_j-j}$ of time $t_i \in \{1, 2, \ldots, N\}$ and No. $j \in \{1, 2, \ldots, j\}$, instrument $j \in \{1, 2, \ldots, J\}$ presents abnormally large error coding.

Figure 4:
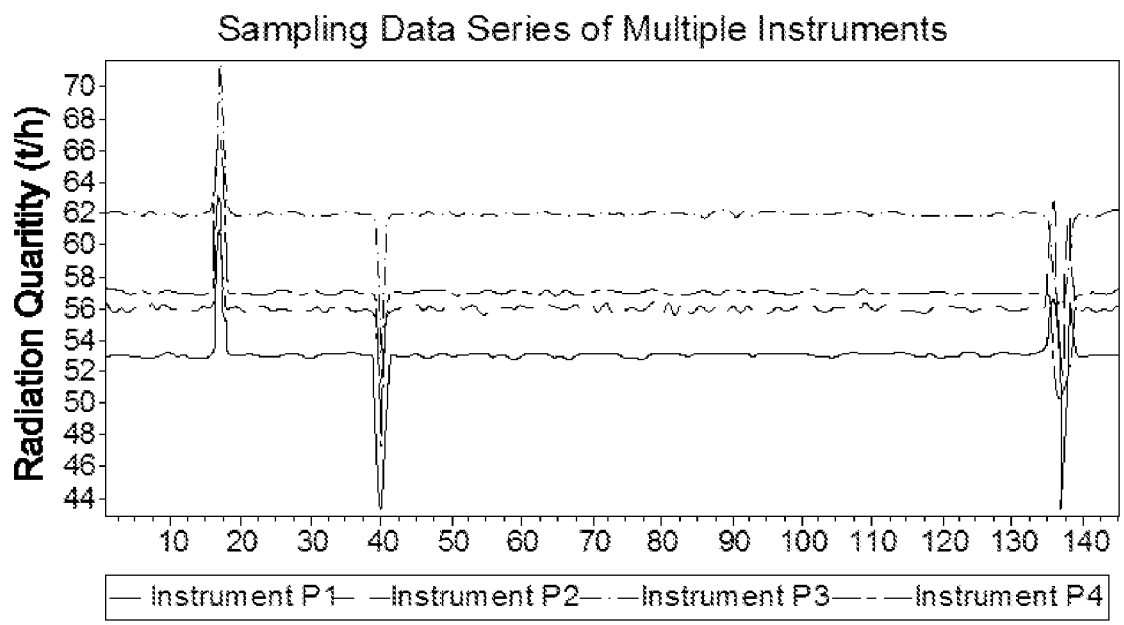
FIG. 4 is a schematic diagram showing a curve of radiation quantity sampling data collected by instruments.
Figure 5:
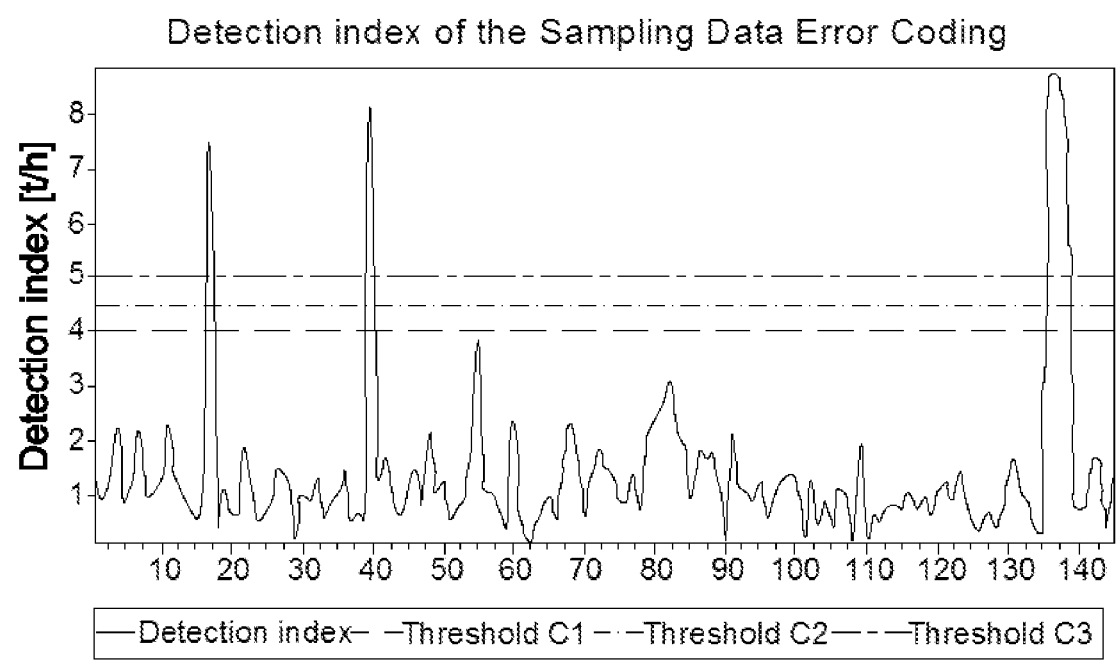
FIG. 5 is a schematic diagram showing radiation quantity changing curves of an instrument error coding index.

The present invention allows for rapid, simple, accurate and efficient detection and identification of abnormal data of instrument error coding and the like. The following description is made by way of Example 1 and Example 2, which show the error coding detection processes and identification effects for heating furnace radiation data and temperature data of a chemical plant, respectively:

Example 1: FIG. 4 shows 24-hour monitoring data from four different monitoring points of heating furnace radiation quantity in a chemical plant, where a group of data is collected every 10 minutes. By a time series stationarity test for FIG. 4, it may be verified that the shown four-dimensional data exhibit a first-order weakly stationary statistical characteristic. A changing curve of detection statistics calculated by Equation (12) is shown in FIG. 5. As can be seen in FIG. 5, the sampled data present error coding at 3 positions, and a plurality of continuous errors occur at the third position of error coding.

Figure 6A:
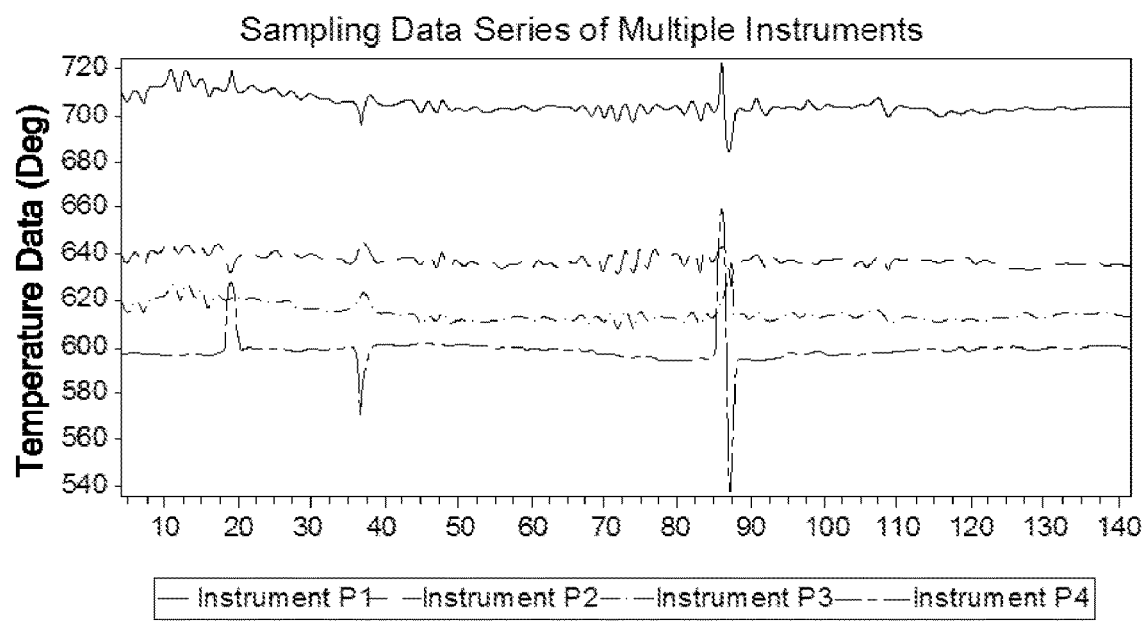
FIG. 6A is a schematic diagram showing changing curves of 24-hour monitoring temperature data from four different monitoring points of heating furnace temperature field in a certain petrochemical plant, in a non-stationary temperature field sampling error coding identification process.
Figure 6B:
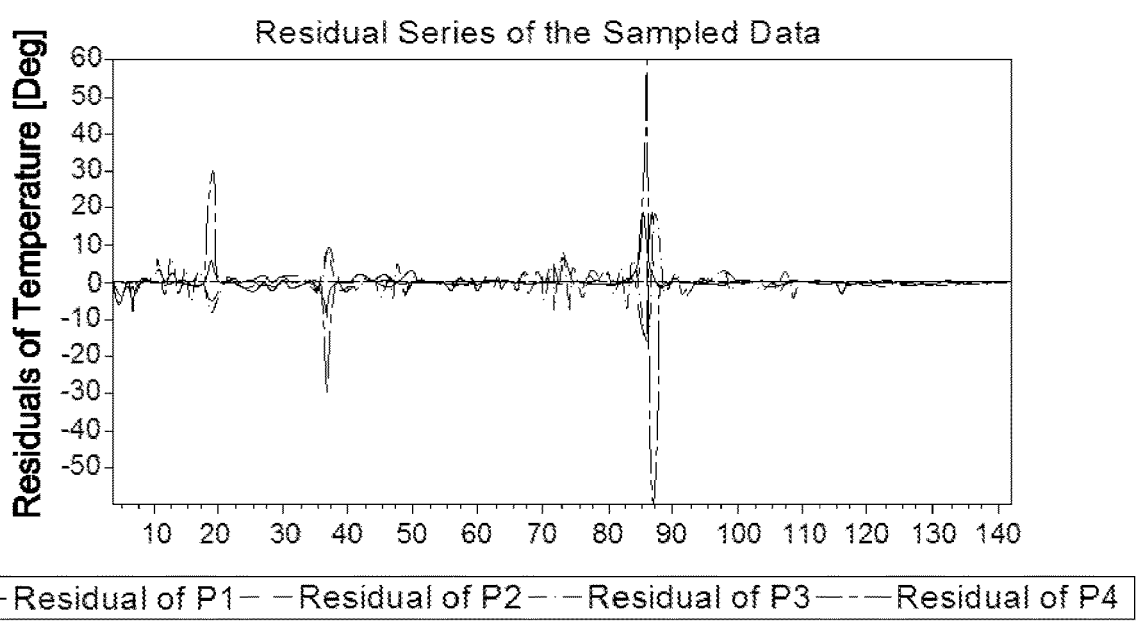
FIG. 6B is a schematic diagram showing changing curves of sliding central smoothing residuals of sampling temperature data from four different monitoring points of heating furnace temperature field in a certain petrochemical plant, in a non-stationary temperature field sampling error coding identification process.
Figure 6C:
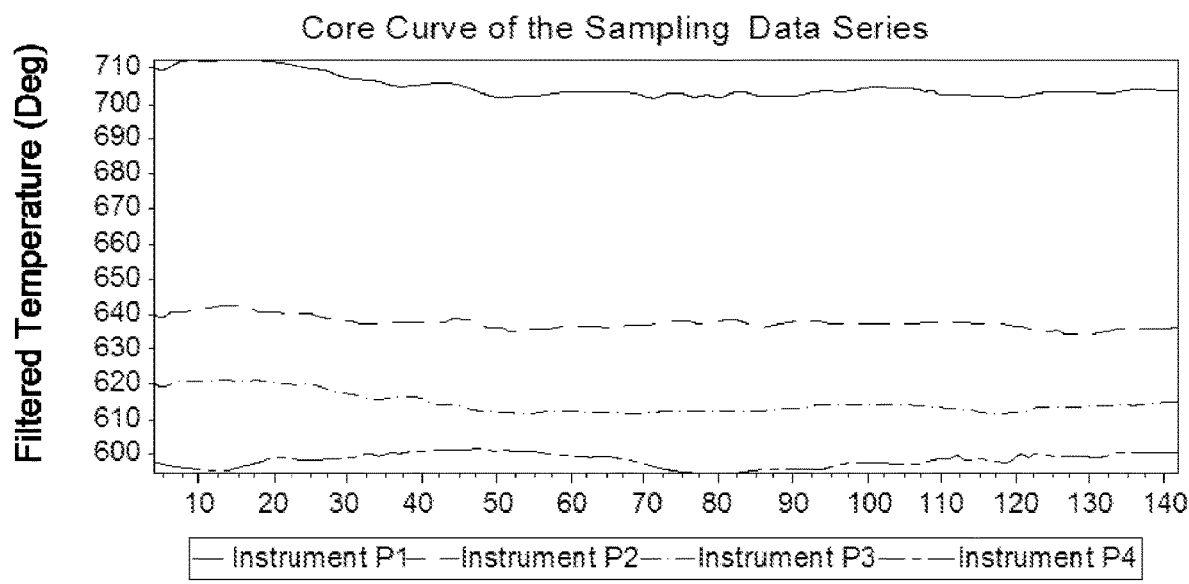
FIG. 6C is a schematic diagram showing changing curves of an axis variation from four different temperature monitoring points of heating furnace temperature field in a certain petrochemical plant, in a non-stationary temperature field sampling error coding identification process.
Figure 6D:
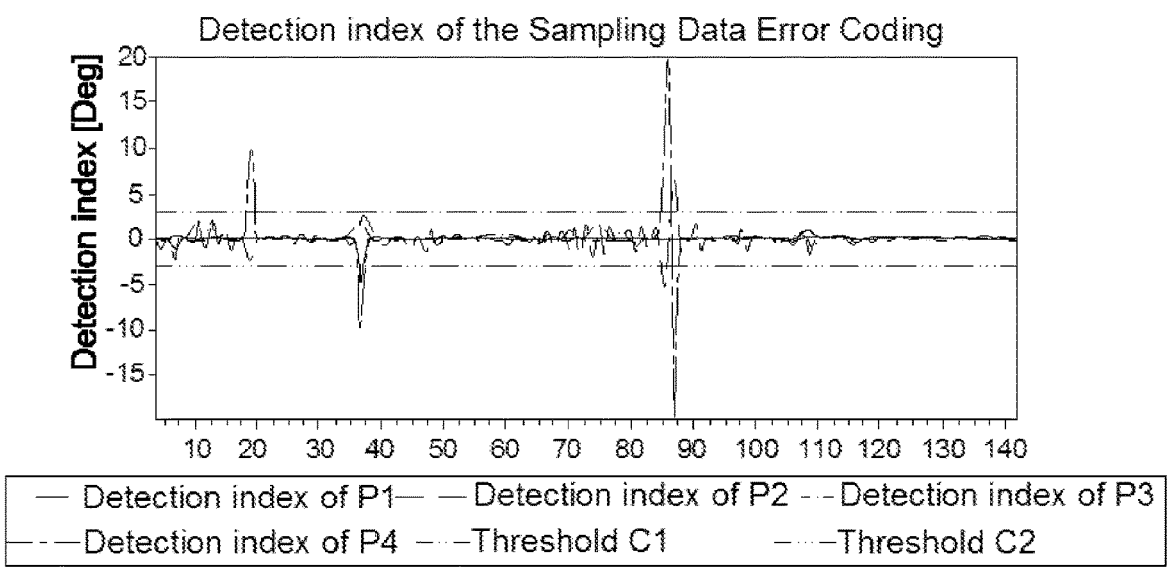
FIG. 6D is a schematic diagram showing changing curves of a detection index from four different temperature monitoring points of heating furnace temperature field in a certain petrochemical plant, in a non-stationary temperature field sampling error coding identification process.

Example 2: FIG. 6A shows changing curves of 24-hour monitoring temperature data (a group of data being collected every 10 minutes) from four different monitoring points of heating furnace temperature field in the petrochemical plant. FIG. 6B shows changing curves of sliding central smoothing residuals of sampling temperature data from four different monitoring points of heating furnace temperature field in the petrochemical plant. FIG. 6C shows changing curves of axis variations from four different temperature monitoring points of heating furnace temperature field in the petrochemical plant. FIG. 6D shows changing curves of detection indexes from four different monitoring points of heating furnace temperature field in the petrochemical plant. Using the changing curves of FIGS. 6A-6D, it can be accurately identified that error coding occurs at 3 positions in the sampled data, and the amplitude of each error can be identified.

Figure 7:
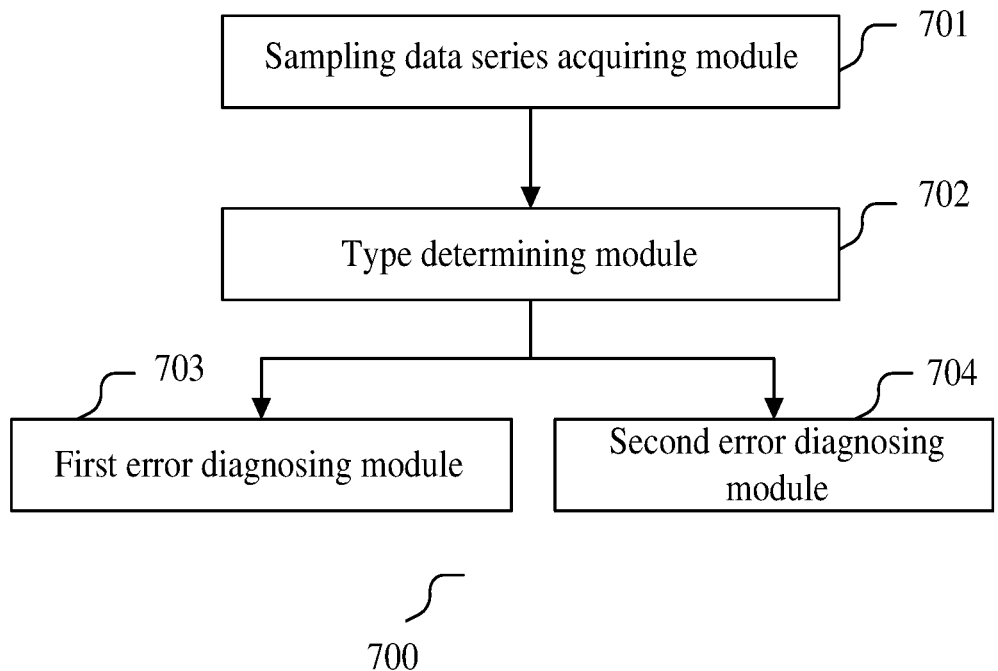
FIG. 7 is a schematic structural diagram showing a system for diagnosis of error coding faults from multiple instruments according to embodiments of the present disclosure.

As shown in FIG. 7, a system 700 for diagnosis of error coding faults from multiple instruments provided in the present disclosure includes:
- a sampling data series acquiring module 701 configured to acquire sampling data series of a combination of instruments in a petrochemical process;
- a type determining module 702 configured to determine a type of the sampling data series, the type of the sampling data series including a multi-dimensional weakly stationary time series and a multi-dimensional non-stationary time series;
- a first error diagnosing module 703 configured to determine a semiorder relation of the sampling data series and then perform error diagnosis when the sampling data series is the multi-dimensional weakly stationary time series; and
- a second error diagnosing module 704 configured to eliminate time-varying components by using a sliding outlier-tolerant filtering method, determine a sampling data series without the time-varying components, and then perform error diagnosis when the sampling data series is the multi-dimensional non-stationary time series.

Figure 8:
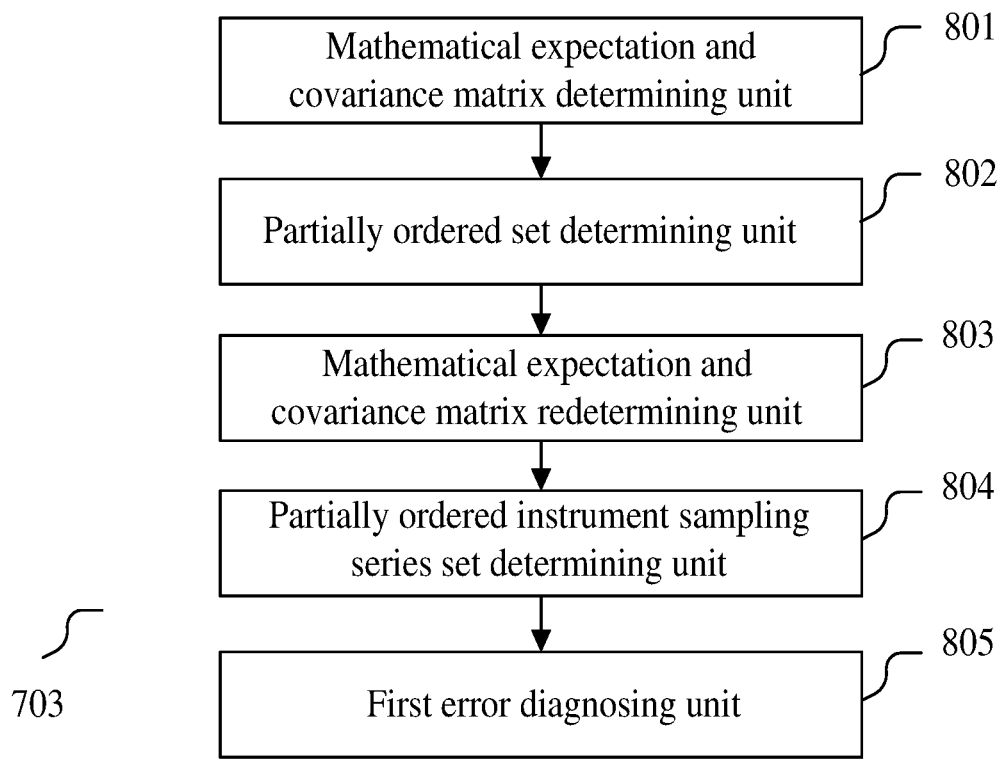
FIG. 8 is a schematic structural diagram showing a first error diagnosis module of the system for diagnosis of error coding faults from multiple instruments according to embodiments of the present disclosure.

As shown in FIG. 8, the first error diagnosing module 703 specifically includes:
- a mathematical expectation and covariance matrix determining unit 801 configured to determine a mathematical expectation and a covariance matrix of the sampling data series;
- a partially ordered set determining unit 802 configured to construct a ranking function for multi-dimensional sampling time sequence data according to the mathematical expectation and the covariance matrix, obtain a ranked series by ranking in an ascending order, and then determine the semiorder relation of the sampling data series to obtain a partially ordered set;
- a mathematical expectation and covariance matrix redetermining unit 803 configured to eliminate data in a set proportion at the tail end of the partially ordered set with N samples, and redetermine a mathematical expectation and a covariance matrix;
- a partially ordered instrument sampling series set determining unit 804 configured to determine a correction value for the ranking function according to the redetermined mathematical expectation and the redetermined covariance matrix, obtain a corrected ranked series by ranking in an ascending order, and then determine a partially ordered instrument sampling series set; and a first error diagnosing unit 805 configured to construct a detection function according to the redetermined mathematical expectation and the redetermined covariance matrix, and perform error diagnosis on the partially ordered instrument sampling series set using the detection function.

Figure 9:
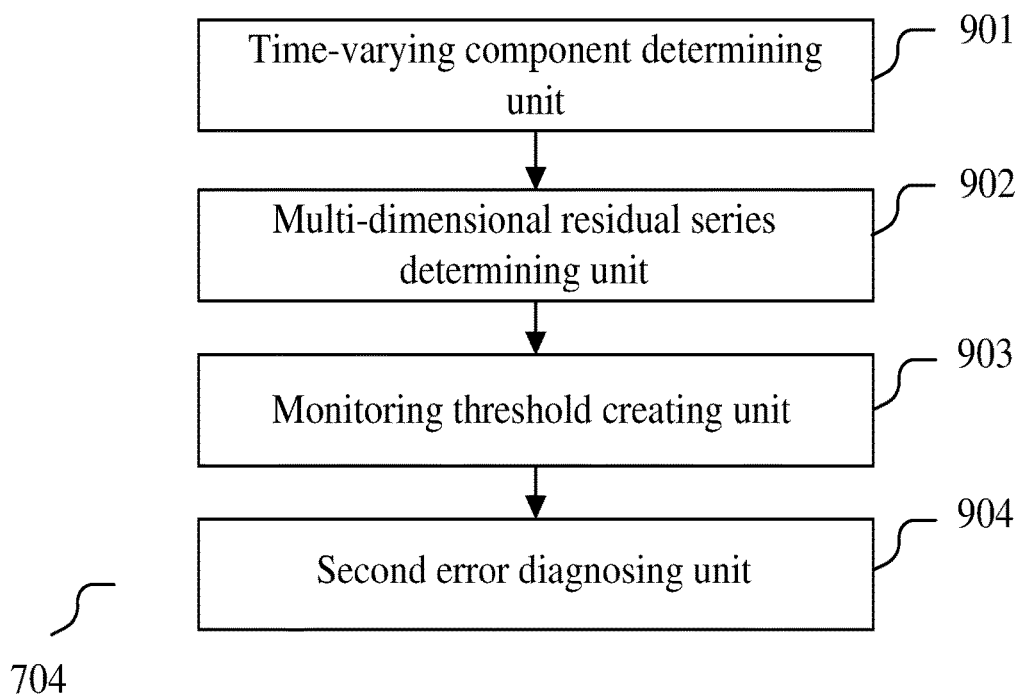
FIG. 9 is a schematic structural diagram showing a second error diagnosis module of the system for diagnosis of error coding faults from multiple instruments according to embodiments of the present disclosure.

As shown in FIG. 9, the second error diagnosing module 704 specifically includes:

a time-varying component determining unit 901 configured to determine and extract the time-varying components from the sampling data series by the sliding outlier-tolerant filtering method;

a multi-dimensional residual series determining unit 902 configured to perform comparison and subtraction between the sampling data series and the extracted time-varying components to determine a multi-dimensional residual series;

a monitoring threshold creating unit 903 configured to create a monitoring threshold for the residual series; and a second error diagnosing unit 904 configured to construct an error detection function, and perform error diagnosis on the sampling data series using the error detection function and the monitoring threshold.

Figure 10:
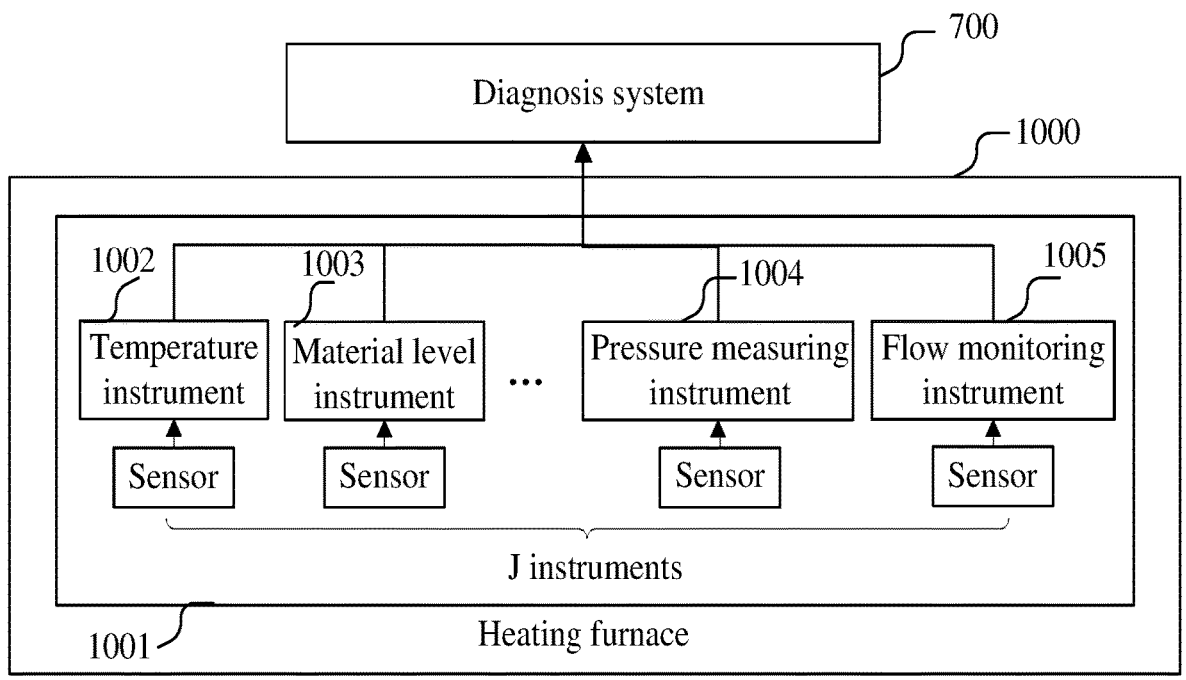
FIG. 10 is a schematic diagram showing a connection relationship between the system for diagnosis of error coding faults from multiple instruments according to embodiments of the present disclosure and J instruments within a combination of instruments disposed at a certain chemical plant.

FIG. 10 is a schematic diagram illustrating a connection relationship between the system 700 for diagnosis of error coding faults from multiple instruments according to embodiments of the present disclosure and the combination 1001 of instruments (with at least one instrument each for measuring temperature, material level, pressure, and flow, and at least one sensor connected to each said instrument) disposed at a heating furnace 1000 within a certain petrochemical plant. As shown in FIG. 10, in the embodiment 2, the system 700 is connected with the combination 1001 of instruments disposed at the heating furnace 1000. The combination 1001 of instruments includes a plurality of instruments. Each instrument of the combination 1001 of instruments includes a sensor. Each sensor senses data such as temperature, material level, pressure and flow within the heating furnace 1000, and respective instruments collects respective sensed data to obtain a sampling data series. The system 700 performs error diagnosis based on the sampling data series and the method according to embodiments of the present disclosure. The system 700 can also determine whether there are error codes in the sampling data series according to a result of the error diagnosis. If there are error codes in the sampling data series, the system 700 will locate the error codes and correct them, to obtain a corrected sampling data series (step S211 in FIG. 2). When the corrected sampling data series is used to monitor the petrochemical production process, it can effectively avoid the outliers of instrument data from being misidentified as faults in the petrochemical production process, and avoid misjudgment of normal or abnormal state of petrochemical production process. When abnormal process parameters are monitored by the system 700, abnormal information can be timely sent to relevant technicians, so that they can find problems and take measures in time.

Figure 11:
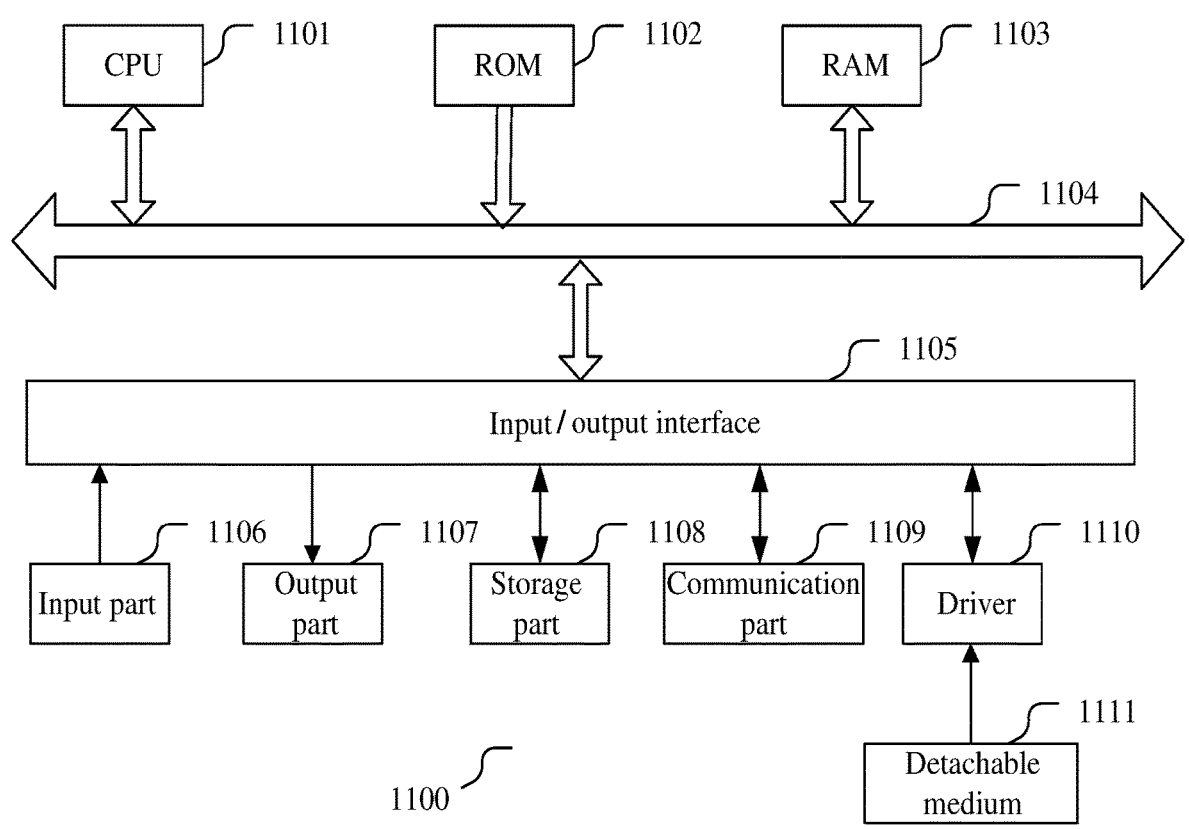
FIG. 11 shows a schematic block diagram of a computer that can be used for implementing the method and the system according to the embodiments of the present disclosure.

In addition, it should be noted that the respective composite parts in the above system can be configured by software, firmware, hardwire or a combination thereof. Specific means or manners that can be used for the configuration are not stated repeatedly herein since they are well-known to those skilled in the art. In case of implementation by software or firmware, programs constituting the software are installed from a storage medium or a network to a computer (e.g., the universal computer 1100 as shown in FIG. 11) having a dedicated hardware structure; the computer, when installed with various programs, can implement various functions and the like. FIG. 11 thus shows a schematic block diagram of a computer that can be used for implementing the method and the system according to the embodiments of the present disclosure. In FIG. 11, a central processing unit (CPU) 1101 executes various processing according to a program stored in a read-only memory (ROM) 1102 or a program loaded from a storage part 1108 to a random-access memory (RAM) 1103. In the RAM 1103, data needed at the time of execution of various processing and the like by the CPU 1101 is also stored according to requirements. The CPU 1101, the ROM 1102 and the RAM 1103 are connected to each other via a bus 1104. An input/output interface 1105 is also connected to the bus 1104. The following components are connected to the input/output interface 1105: an input part 1106 (including a keyboard, a mouse and the like); an output part 1107 (including a display, such as a Cathode Ray Tube (CRT), a Liquid Crystal Display (LCD) and the like, as well as a loudspeaker and the like); the storage part 1108 (including a hard disc and the like); and a communication part 1109 (including a network interface card such as an LAN card, a modem and so on). The communication part 1109 performs communication processing via a network such as the Internet. According to requirements, a driver 1110 may also be connected to the input/output interface 1105. A detachable medium 1111 such as a magnetic disc, an optical disc, a magnetic optical disc, a semiconductor memory and the like may be installed on the driver 1110 according to requirements, such that a computer program read therefrom is installed in the storage part 1108 according to requirements.

In the case of carrying out the foregoing series of processing by software, programs constituting the software are installed from a network such as the Internet or a storage medium such as the detachable medium 1111. Those skilled in the art should appreciate that such a storage medium is not limited to the detachable medium 1111 storing therein a program and distributed separately from the apparatus to provide the program to a user as shown in FIG. 11. Examples of the detachable medium 1111 include a magnetic disc (including floppy Disc®), a compact disc (including compact disc read-only memory (CD-ROM) and digital versatile disc (DVD), a magneto optical disc (including mini disc (MD®)), and a semiconductor memory. Or, the storage medium may be hard discs and the like included in the ROM 1102 and the storage part 1108 in which programs are stored, and are distributed concurrently with the apparatus including them to users. The present disclosure further proposes a program product storing therein a machine-readable instruction code that, when read and executed by a machine, can implement the aforesaid method according to the embodiments of the present disclosure. Correspondingly, a storage medium for carrying the program product storing therein the machine-readable instruction code is also included in the disclosure of the present disclosure. The storage medium includes but is not limited to a floppy disc, an optical disc, a magnetic optical disc, a memory card, a memory stick and the like.

In summary, the method and system for diagnosis of error coding faults from multiple instruments according to embodiments of the present disclosure can solve the error coding problem in the multi-instrument cooperation mode and provide safe and reliable data guarantee for safe and efficient petrochemical production by converting sensed data acquired by instruments of a combination of instruments into a sampling data series and then performing error diagnosis according to the type of the sampling data series of the combination of instruments.

While various aspects are disclosed herein in the context of certain preferred embodiments, implementations, and examples, it will be understood by those skilled in the art that the present invention extends beyond the specifically disclosed embodiments to other alternative embodiments and/or uses of the inventive aspects and obvious modifications and equivalents thereof. In addition, while a number of variations of the aspects have been noted, other modifications, which are within their scope, will be readily apparent to those of skill in the art based upon this disclosure. It should be understood also that the scope this disclosure includes the various combinations or sub-combinations of the specific features and aspects of the embodiments disclosed herein, such that the various features, modes of implementation and operation, and aspects of the disclosed subject matter may be combined with or substituted for one another. Structural and logical substitutions and changes may be made that fall within the scope of this disclosure, which is intended to cover any adaptations and variations of the particular implemented described herein and combination of the various features and component elements thereof. The scope of the present invention should not be limited by the particular disclosed embodiments or implementations described above, but should be determined only by the claims.

What is claimed is:

1. A method for diagnosis of error coding faults from multiple instruments, comprising:
   acquiring a sampling data series of a combination of instruments in a petrochemical process;
   determining the type of the sampling data series according to whether a stationary detection index of the sampling data series is within a default of a detection threshold, the type of the sampling data series comprising a multi-dimensional weakly stationary time series or a multi-dimensional non-stationary time series;
   if the sampling data series is a multi-dimensional weakly stationary time series, determining a semiorder relation of the sampling data series;
   if the sampling data series is a multi-dimensional non-stationary time series, eliminating time-varying components by using a sliding outlier-tolerant filtering method and determining a sampling data series without the time-varying components;
   performing error code diagnosis;
   determining whether there are error codes in the sampling data series according to a result of the error code diagnosis; and
   if there are error codes in the sampling data series, locating the error codes and correcting them, thereby acquiring a corrected sampling data series and using it to monitor the petrochemical production.

2. The method for diagnosis of error coding faults from multiple instruments according to claim 1, wherein the steps of, determining a semiorder relation of the sampling data series if the sampling data series is a multi-dimensional weakly stationary time series, and performing error code diagnosis comprise:
   determining a mathematical expectation and a covariance matrix of the sampling data series;
   constructing a ranking function for multi-dimensional sampling time sequence data according to the mathematical expectation and the covariance matrix, obtaining a ranked series by ranking in an ascending order, and then determining the semiorder relation of the sampling data series to obtain a partially ordered set;
   eliminating data in a set proportion at the tail end of the partially ordered set with N samples, and redetermining a mathematical expectation and a covariance matrix;
   determining a correction value for the ranking function according to the redetermined mathematical expectation and the redetermined covariance matrix, obtaining a corrected ranked series by ranking in an ascending order, and then determining a partially ordered instrument sampling series set;
   constructing a detection function according to the redetermined mathematical expectation and the redetermined covariance matrix; and
   performing error code diagnosis on the partially ordered instrument sampling series set using the detection function.

3. The method for diagnosis of error coding faults from multiple instruments according to claim 1, wherein the steps of eliminating time-varying components by using a sliding outlier-tolerant filtering method and determining a sampling data series without the time-varying components if the sampling data series is a multi-dimensional non-stationary time series, and performing error code diagnosis comprise:
   determining and extracting the time-varying components from the sampling data series by using the sliding outlier-tolerant filtering method;
   performing comparison and subtraction between the sampling data series and the extracted time-varying components to determine a multi-dimensional residual series;
   creating a monitoring threshold for the residual series;
   constructing an error detection function; and
   performing detection on the sampling data series using the error detection function and the monitoring threshold to realize error code diagnosis.

4. A system for diagnosis of error coding faults from multiple instruments in a petrochemical process, from which combination of instruments a sampling data series can be acquired that is a multi-dimensional weakly stationary time series or a multi-dimensional non-stationary time series, the system comprising:
   a type determining module configured to determine the type of a sampling data series acquired from the combination of instruments according to whether a stationary detection index of the sampling data series is within a default of a detection threshold;
   a first error diagnosing module configured to, if the sampling data series is a multi-dimensional weakly stationary time series, determine a semiorder relation of the sampling data series, and then perform error code diagnosis;
   a second error diagnosing module configured to, if the sampling data series is a multi-dimensional non-stationary time series, eliminate time-varying components by using a sliding outlier-tolerant filtering method and determine a sampling data series without the time-varying components, and then perform error code diagnosis; and
   means for determining whether there are error codes in the sampling data series according to a result of the error code diagnosis, and if there are error codes in the sampling data series, locating the error codes and correcting them so as to acquire a corrected sampling data series that can be used to monitor the petrochemical production.

5. The system for diagnosis of error coding faults from multiple instruments according to claim 4, wherein the first error diagnosing module specifically comprises:
- a mathematical expectation and covariance matrix determining unit configured to determine a mathematical expectation and a covariance matrix of the sampling data series;
- a partially ordered set determining unit configured to construct a ranking function for multi-dimensional sampling time sequence data according to the mathematical expectation and the covariance matrix, obtain a ranked series by ranking in an ascending order, and then determine the semiorder relation of the sampling data series to obtain a partially ordered set;
- a mathematical expectation and covariance matrix redetermining unit configured to eliminate data in a set proportion at the tail end of the partially ordered set with N samples, and predetermine a mathematical expectation and a covariance matrix;
- a partially ordered instrument sampling series set determining unit configured to determine a correction value for the ranking function according to the redetermined mathematical expectation and the redetermined covariance matrix, and obtain a corrected ranked series by ranking in an ascending order and hence a partially ordered instrument sampling series set; and
- a first error diagnosing unit configured to construct a detection function according to the redetermined mathematical expectation and the redetermined covariance matrix, and perform error code diagnosis on the partially ordered instrument sampling series set using the detection function.

6. The system for diagnosis of error coding faults from multiple instruments according to claim 4, wherein the second error diagnosing module specifically comprises:
- a time-varying component determining unit configured to determine and extract time-varying components from the sampling data series by using the sliding outlier-tolerant filtering method;
- a multi-dimensional residual series determining unit configured to perform comparison and subtraction between the sampling data series and the extracted time-varying components to determine a multi-dimensional residual series;
- a monitoring threshold creating unit configured to create a monitoring threshold for the residual series; and
- a second error diagnosing unit configured to construct an error detection function, and perform detection on the sampling data series using the error detection function and the monitoring threshold to realize error code diagnosis.

7. The system for diagnosis of error coding faults from multiple instruments according to claim 4, wherein determining the semiorder relation of the sampling data series if the sampling data series is the multi-dimensional weakly stationary time series, and performing error code diagnosis comprises:
- determining a mathematical expectation and a covariance matrix of the sampling data series;
- constructing a ranking function for multi-dimensional sampling time sequence data according to the mathematical expectation and the covariance matrix, obtaining a ranked series by ranking in an ascending order, and then determining the semiorder relation of the sampling data series to obtain a partially ordered set;
- eliminating data in a set proportion at the tail end of the partially ordered set with N samples, and redetermining a mathematical expectation and a covariance matrix;
- determining a correction value for the ranking function according to the redetermined mathematical expectation and the redetermined covariance matrix, and obtaining a corrected ranked series by ranking in an ascending order and then determining a partially ordered instrument sampling series set; and
- constructing a detection function according to the redetermined mathematical expectation and the redetermined covariance matrix, and performing error code diagnosis on the partially ordered instrument sampling series set using the detection function.

8. The system for diagnosis of error coding faults from multiple instruments according to claim 4, wherein eliminating time-varying components by using the sliding outlier-tolerant filtering method and determining the sampling data series without the time-varying components if the sampling data series is the multi-dimensional non-stationary time series, and performing error code diagnosis comprises:
- determining and extracting time-varying components from the sampling data series by using the sliding outlier-tolerant filtering method;
- performing comparison and subtraction between the sampling data series and the extracted time-varying components to determine a multi-dimensional residual series;
- creating a monitoring threshold for the residual series; and
- constructing an error detection function, and performing detection on the sampling data series using the error detection function and the monitoring threshold to realize error code diagnosis.

9. A computer readable storage medium having a computer program stored thereon, and the computer program, when executed by a processor, implements the method according to claim 1.

10. A computer readable storage medium having a computer program stored thereon, and the computer program, when executed by a processor, implements the method according to claim 2.

11. A computer readable storage medium having a computer program stored thereon, and the computer program, when executed by a processor, implements the method according to claim 3.

12. A system for diagnosis of error coding faults from multiple instruments in a petrochemical process from which instruments can be acquired a sampling data series that is a multi-dimensional weakly stationary time series or a multi-dimensional non-stationary time series, the system comprising a processor and a memory storing program codes, wherein the processor performs the stored program codes for:
- determining the type of an acquired sampling data series according to whether a stationary detection index of the sampling data series is within a default of a detection threshold;
- if the sampling data series is a multi-dimensional weakly stationary time series, determining a semiorder relation of the sampling data series, and then performing error code diagnosis;
- if the sampling data series is a multi-dimensional non-stationary time series, eliminating time-varying components by using a sliding outlier-tolerant filtering method and determining a sampling data series without the time-varying components, and then performing error code diagnosis;

determining whether there are error codes in the sampling data series according to a result of the error code diagnosis, and if there are error codes in the sampling data series, locating the error codes and correcting them so as to acquire a corrected sampling data series that can be used to monitor the petrochemical production.

\* \* \* \* \*